(12) United States Patent
Takeda

(10) Patent No.: US 9,752,525 B2
(45) Date of Patent: Sep. 5, 2017

(54) FUEL INJECTION CONTROL APPARATUS

(71) Applicant: Mitsubishi Jidosha Kogyo Kabushiki Kaisha, Tokyo (JP)

(72) Inventor: Atsushi Takeda, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 14/737,620

(22) Filed: Jun. 12, 2015

(65) Prior Publication Data
US 2015/0377169 A1    Dec. 31, 2015

(30) Foreign Application Priority Data
Jun. 30, 2014  (JP) .................................. 2014-135053

(51) Int. Cl.
| | |
|---|---|
| *F02D 41/00* | (2006.01) |
| *F02D 41/26* | (2006.01) |
| *F02B 75/02* | (2006.01) |
| *F02D 41/18* | (2006.01) |
| *F02D 41/30* | (2006.01) |

(Continued)

(52) U.S. Cl.
CPC .............. *F02D 41/26* (2013.01); *F02B 75/02* (2013.01); *F02D 41/18* (2013.01); *F02D 41/30* (2013.01); *F02D 41/3094* (2013.01); *F02D 41/40* (2013.01); *F02D 41/402* (2013.01);
(Continued)

(58) Field of Classification Search
CPC ............................ F02D 41/008; F02D 41/009
See application file for complete search history.

(56) References Cited

U.S. PATENT DOCUMENTS 4,779,214 A * 10/1988 Kinugasa ................ G01P 3/489
                                                          701/110
5,044,343 A *  9/1991 Kanno .................. F02D 41/045
                                                          123/493
(Continued)

FOREIGN PATENT DOCUMENTS

| JP | 4100806 B2 | 6/2008 |
| JP | 2012-163010 A | 8/2012 |

OTHER PUBLICATIONS

Extended European Search Report issued on Dec. 22, 2015 in related European Application No. 15174440.6.

*Primary Examiner* — Thomas Moulis
(74) *Attorney, Agent, or Firm* — Birch, Stewart, Kolasch & Birch, LLP

(57) ABSTRACT

A fuel injection control apparatus of a four cycle engine having six cylinders comprises: a crank angle detection device for detecting the crank angle of the four cycle engine; a first computation device for computing the quantity of fuel, which is injected in a predetermined stroke of a four stroke cycle, at a first computation timing; a second computation device for computing the quantity of fuel, which is injected one stroke before the predetermined stroke, at a second computation timing 240 degrees ahead of the crank angle of the first computation timing; and a third computation device for computing the quantity of fuel, which is injected two strokes before the predetermined stroke, at a third computation timing 120 degrees ahead of the crank angle of the second computation timing. The fuel injection control apparatus is adapted to decrease interruptions by computations for fuel injection control in the six cylinder engine, and reduce control load.

8 Claims, 4 Drawing Sheets

(51) Int. Cl.
  *F02D 41/40*   (2006.01)
  *F02D 41/10*   (2006.01)
  *F02D 41/34*   (2006.01)

(52) U.S. Cl.
  CPC .............. *F02D 41/10* (2013.01); *F02D 41/34* (2013.01); *F02D 2250/12* (2013.01); *Y02T 10/44* (2013.01)

(56) References Cited

U.S. PATENT DOCUMENTS

| | | | |
|---|---|---|---|
| 5,107,814 A | 4/1992 | Nishiyama et al. | |
| 5,156,131 A * | 10/1992 | Kisaichi | F02D 41/185 123/492 |
| 7,271,558 B2 * | 9/2007 | Aspelmayr | F02D 41/009 123/406.47 |
| 2003/0089334 A1 * | 5/2003 | Yomogida | F02D 41/3836 123/300 |
| 2008/0091328 A1 * | 4/2008 | Tabata | F02D 9/00 701/102 |
| 2008/0114524 A1 * | 5/2008 | Idogawa | F02D 41/061 701/103 |
| 2016/0003169 A1 * | 1/2016 | Leone | F02D 41/0087 123/481 |

\* cited by examiner

FUEL INJECTION CONTROL APPARATUS

The entire disclosure of Japanese Patent. Application No. 2014-135053 filed on Jun. 30, 2014 is expressly incorporated by reference herein.

TECHNICAL FIELD

This invention relates to a fuel injection control apparatus and, in particular, a fuel injection control apparatus in a six cylinder engine.

BACKGROUND ART

In an engine, fuel injection control has so far been exercised based on an injection volume computed from the amount of intake air into each cylinder. Among such control devices for an engine is one having a cylinder injection valve for injecting fuel directly into the combustion chamber (cylinder) of the engine (see, for example, Patent Document 1). In the case of a four stroke cycle (or four cycle) engine, moreover, the fuel injection volume is corrected in accordance with the amount of air increased during an intake stroke of a combustion cycle.

PRIOR ART DOCUMENTS

Patent Documents

[Patent Document 1] Japanese Patent No. 4100806

SUMMARY OF THE INVENTION

Problems to be Solved by the Invention

Patent Document 1, however, makes no disclosure of how to compute the quantity of fuel to be injected in each stroke based on the measured intake air amount in connection with the cylinders during strokes other than a compression stroke and the intake stroke of the four stroke cycle. Nor does the document disclose how to reduce computation load in computing the fuel injection volume in each stroke. No description is presented of a six cylinder engine, in particular.

The present invention has been accomplished to solve the above-mentioned problems. It is an object of this invention to provide a fuel injection control apparatus which can reduce control load involved in the computation of the fuel injection volume in the six cylinder engine.

Means for Solving the Problems

A first aspect of the present invention for attaining the above object is a fuel injection control apparatus of a four cycle engine having six cylinders, comprising: a crank angle detection device for detecting the crank angle of the four cycle engine; a first computation device for computing the quantity of fuel, which is injected when the cylinder is in a predetermined stroke of a four stroke cycle, at a first computation timing; a second computation device for computing the quantity of fuel, which is injected one stroke before the predetermined stroke, at a second computation timing substantially 240 degrees ahead of the crank angle of the first computation timing; and a third computation device for computing the quantity of fuel, which is injected two strokes before the predetermined stroke, at a third computation timing substantially 120 degrees ahead of the crank angle of the second computation timing.

According to the above first aspect, the respective computation timings for the quantities of fuel to be injected into the six cylinder engine can be matched, and the quantity of fuel to be injected in each stroke can be appropriately computed, with control load being reduced.

A second aspect of the present invention is the above fuel injection control apparatus, further comprising: a fuel quantity recording device for recording the fuel quantity computed by each of the computation devices; and an intake air amount calculation device for calculating the amount of intake air taken in not later than each of the computation timings, wherein the first computation device computes the quantity of fuel, which is injected in the predetermined stroke, from the difference between the quantity of fuel corresponding to the amount of air taken in not later than the first computation timing and the sum of the fuel quantities computed by the second and third computation devices.

According to the second aspect mentioned above, the quantity of fuel already injected is subtracted from the required fuel quantity corresponding to the amount of air taken in during or before each stroke to compute the quantity of fuel to be injected. Thus, an error in the actual injection volume is lessened.

A third aspect of the present invention is the above fuel injection control apparatus, wherein the first computation device calculates the amount of intake air taken in not later than the first computation timing, based on the amount of intake air taken in during a period from the first computation timing to a point in time substantially 120 degrees ahead of the first computation timing.

According to the third aspect, the quantity of fuel already injected is subtracted from the required fuel quantity corresponding to the amount of air taken in during or before each stroke to compute the quantity of fuel to be injected. Thus, an error in the actual injection volume is lessened.

A fourth aspect of the present invention is the above fuel injection control apparatus, wherein the second computation device computes the quantity of fuel, which is injected one stroke before the predetermined stroke, from the difference between the quantity of fuel corresponding to the amount of air taken in not later than the second computation timing and the quantity of fuel computed by the third computation device not later than the second computation timing.

According to the fourth aspect, the quantity of fuel already injected is subtracted from the required fuel quantity corresponding to the amount of air taken in during or before each stroke to compute the quantity of fuel to be injected. Thus, an error in the actual injection volume is reduced.

A fifth aspect of the present invention is the above fuel injection control apparatus, wherein the predetermined stroke is a compression stroke, the first computation device computes the quantity of fuel to be injected in the compression stroke of the four stroke cycle, the second computation device computes the quantity of fuel to be injected in an intake stroke of the four stroke cycle, and the third computation device computes the quantity of fuel to be injected in an exhaust stroke of the four stroke cycle.

According to the fifth aspect, the quantities of fuel conformed to the amounts of air before the respective strokes, i.e., compression, intake and exhaust strokes, can be computed, precise fuel injection can be performed, and control load involved in the computation of the fuel injection volume can be reduced.

A sixth aspect of the present invention is the above fuel injection control apparatus, wherein the first computation timing is in the intake stroke of the four stroke cycle, the second computation timing is in an exhaust stroke of the four stroke cycle, and the third computation timing is in an expansion stroke of the four stroke cycle.

According to the sixth aspect, the quantities of fuel conformed to the amounts of air before the respective strokes, i.e., compression, intake and exhaust strokes, can be computed, precise fuel injection can be performed, and control load involved in the computation of the fuel injection volume can be reduced.

A seventh aspect of the present invention is the above fuel injection control apparatus, wherein the four cycle engine has a first fuel injection valve, provided in each of the six cylinders, for injecting fuel into the cylinders, and a second fuel injection valve for injecting fuel into an intake pipe of the four cycle engine; the first and second computation devices compute the fuel quantities by the first fuel injection valves; and the third computation device computes the fuel quantity by the second fuel injection valve.

According to the seventh aspect, the quantity of fuel to be injected by the second fuel injection valve and the quantity of fuel to be injected by the first fuel injection valve can be optimized, the state of spray can be ameliorated, and an exhaust gas can be decreased.

An eighth aspect of the present invention is the above fuel injection control apparatus, further comprising a ratio determination device for determining the ratio of the quantities of fuel to be injected from the first fuel injection valve and the second fuel injection valve, wherein the third computation device performs computation by multiplying the quantity of fuel corresponding to the amount of air, which has been taken in not later than the third computation timing, by the ratio determined by the ratio determination device.

According to the eighth aspect, the quantity of fuel to be injected by the second fuel injection valve and the quantity of fuel to be injected by the first fuel injection valves can be optimized according to the ratio determined by the ratio determination device, whereby the state of spray can be further ameliorated, and an exhaust gas can be decreased.

Effects of the Invention

According to the present invention, there is provided a fuel injection control apparatus which can decrease interruptions by computations for fuel injection control in the six cylinder engine to reduce the control load involved in fuel injection volume computation.

MODE FOR CARRYING OUT THE INVENTION

An embodiment of a fuel injection control apparatus according to the present invention will be described concretely with reference to the accompanying drawings. Such an embodiment illustrates an aspect of the present invention, and does not limit this invention, but can be changed or modified optionally within the scope of the invention. In the respective drawings, the same members are assigned the same numerals, and explanations are omitted as appropriate.

Figure 1:
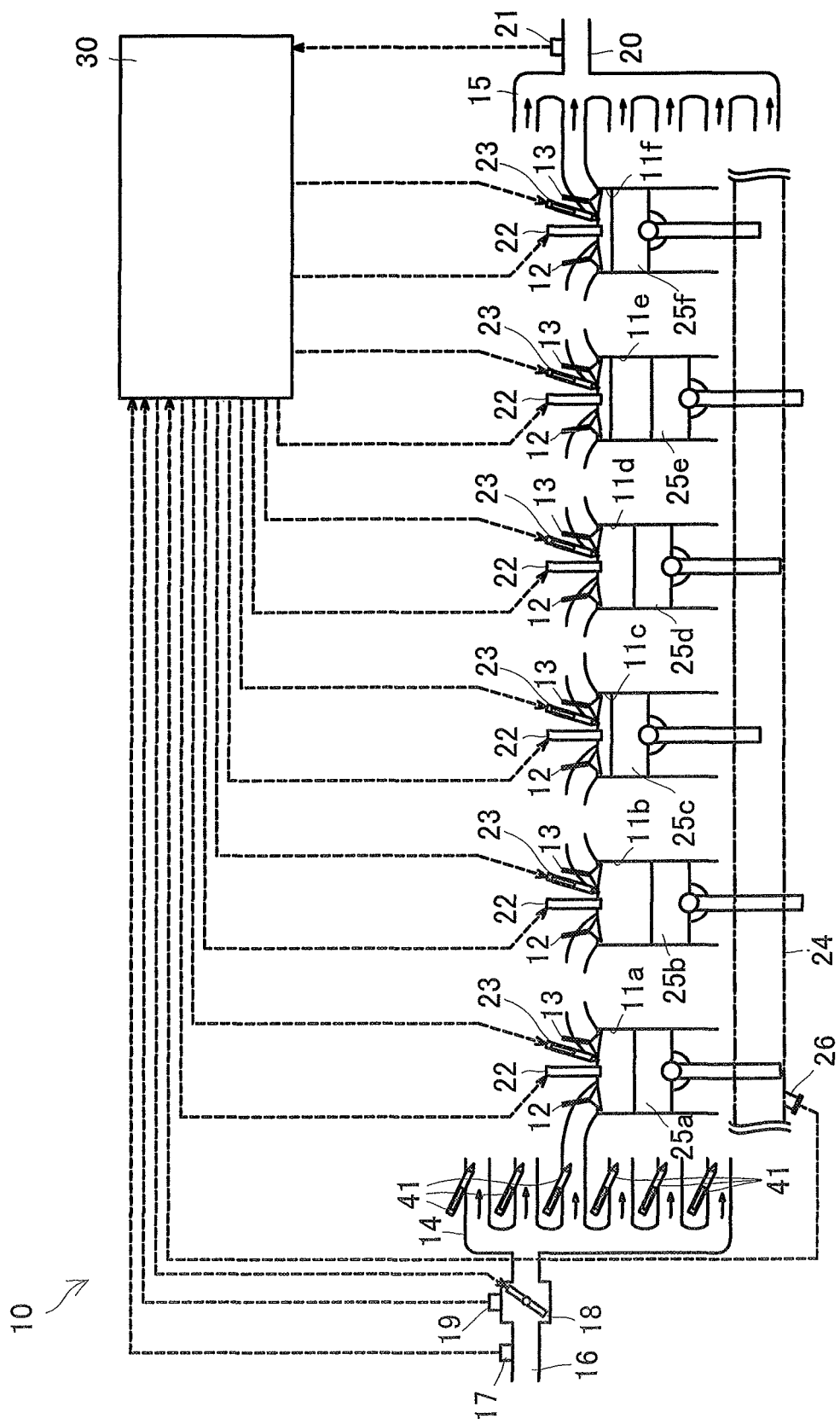
FIG. 1 is a view showing an entire configuration example of a six-cylinder four cycle engine according to the present embodiment.

FIG. 1 shows an example of the entire configuration of a four cycle engine (may hereinafter be referred to simply as "engine") having six cylinders which is controlled by the fuel injection control apparatus according to the embodiment of the present invention.

As shown in the drawing, cylinders $11a$ to $11f$ of an engine 10 are each provided with an intake valve 12 and an exhaust valve 13. Branch parts of an intake manifold 14 are connected to the side of the intake valves 12, while branch parts of an exhaust manifold 15 are connected to the side of the exhaust valves 13.

An intake passage 16 is connected to the intake manifold 14. The intake passage 16 is provided, from an upstream side toward a downstream side, with an intake air amount sensor 17 for detecting the flow rate of intake air, a throttle valve 18 for adjusting the flow rate of intake air, and a throttle position sensor 19 for detecting the opening degree of the throttle valve. The opening degree of the throttle valve 18 is interlocked with an accelerator pedal (not shown). This opening degree is adjusted by a control signal from a fuel injection control apparatus 30, whereby the flow rate of intake air introduced into each of the cylinders $11a$ to $11f$ is adjusted. To the exhaust manifold 15, an exhaust passage 20 is connected. The exhaust passage 20 is provided, from the upstream side toward the downstream side, with an air-fuel ratio sensor 21 and an exhaust purification device (not shown).

Each of the cylinders $11a$ to $11f$ is provided with an ignition plug 22 for performing ignition, and a cylinder injection valve (first fuel injection valve 23) for directly injecting fuel into each cylinder ($11a$ to $11f$). In accordance with the rotation of a crankshaft 24, pistons $25a$ to $25f$ reciprocate inside the cylinders $11a$ to $11f$ and, when the interior of the cylinders $11a$ to $11f$ is in a compressed state, for example, fuel is injected into the cylinders $11a$ to $11f$. Upon explosion inside the cylinders $11a$ to $11f$, the pistons $25a$ to $25f$ are pressed down to rotate the crankshaft 24 further, thereby obtaining a driving force.

The engine 10 is provided with a crank angle sensor 26 for detecting a crank angle. In the branch parts of the intake manifold 14 of the engine 10, manifold injection valves (second fuel injection valves 27) are provided. By the second fuel injection valves 27, fuel can be injected from the intake side to introduce an air-fuel mixture of a uniform concentration into the cylinders $11a$ to $11f$.

Figure 2:
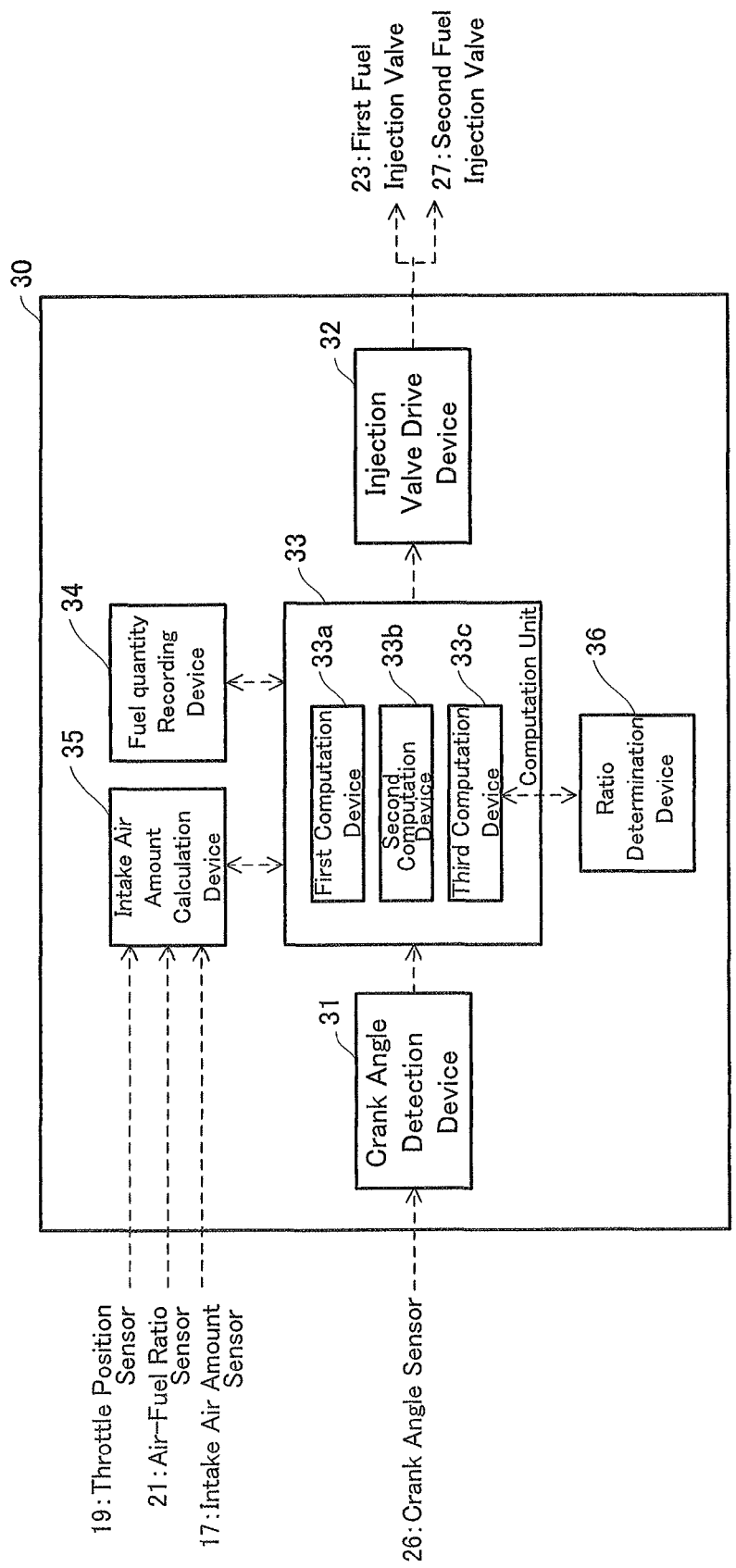
FIG. 2 is a block diagram showing a configuration example of a fuel injection control apparatus according to the present embodiment.

Next, the configuration of the fuel injection control apparatus 30 according to the present embodiment will be described. FIG. 2 is a block diagram expressing the configuration of the fuel injection control apparatus according to the present embodiment in functional blocks. The fuel injection control apparatus 30 is composed mainly of a microcomputer of a publicly known configuration including an ECU (electronic control unit), and is equipped with a crank angle detection device 31, an injection valve drive device 32, and a computation unit 33. The computation unit 33 performs computations for fuel injection control, and is configured to include a first computation device $33a$, a second computation device $33b$, and a third computation device $33c$. These components are implemented, concretely, by the execution of programs by the microcomputer.

The fuel injection control apparatus 30 is also equipped with a storage unit (RAM: random access memory; not shown). The storage unit stores not only information on detections and computations in the respective components, but also information from various sensors, including the intake air amount sensor 17, the throttle position sensor 19, the air-fuel ratio sensor 21, and the crank angle sensor 26 provided in the engine 10. The stored information is loaded into the respective components, where necessary.

The crank angle detection device 31 detects the crank angle based on a signal from the crank angle sensor 26. Information on the crank angle is transmitted to the computation unit 33, and used, for example, for determination of a computation timing for fuel injection control.

The injection valve drive device 32 exercises energization control over actuators for the first fuel injection valve 23 or the second fuel injection valve 27 based on a drive signal generated by the computation unit 33. Upon such energization control, fuel is injected.

The quantities of fuel to be injected in the respective strokes, i.e., exhaust, intake, compression and expansion strokes, are determined from the amounts of intake air before the respective strokes. In the case of the four cylinder engine, a phase difference of 180 degrees in the crank angle between the respective cylinders coincides with the period of the combustion cycle (intake, compression, expansion, exhaust) of the four cycle engine. Thus, the computations are performed in a computation cycle of 180 degrees. These computations may be performed while the amount of intake air is increasing or decreasing, that is, when the amount of accelerator pedaling by the driver is increased or decreased, whereby the vehicle is in a transient state during acceleration or deceleration. In a steady state, computation can be performed once during the exhaust stroke or expansion stroke of the combustion cycle (intake, compression, expansion, exhaust) of the four cycle engine. In the transient state, however, the amount of intake air varies over time, so that computational processing by the ECU requires additional computation (computation upon interruption). This means that in view of the transient state, the computation load on the ECU will increase. Furthermore, the present embodiment is directed at the six cylinder engine. If the control over a four cycle four cylinder engine, for which computations for fuel injection volume are performed in synchronism with the period of the combustion cycle, is applied as such, any one of the six cylinders undergoes an intake, compression, expansion or exhaust stroke at intervals of 60 degrees. In this case, additional computation (an interruption by computation) is required at each crank angle of 60 degrees. With the six cylinder engine, therefore, the number of computations is 3 times that in the four cylinder engine, and a load on normal computational processing is too high. To solve this problem, it is conceivable to install a control device having high processing capabilities. However, this is costly, and increases the amount of computational processing, thereby raising the possibility that the reliability of computations declines.

Under these circumstances, the first computation device 33a in the computation unit 33 computes the quantity of fuel, which is injected in a predetermined stroke of the four stroke cycle, at a first computation timing; the second computation device 33b computes the quantity of fuel, which is injected one stroke before the predetermined stroke, at a second computation timing 240 degrees ahead of the crank angle of the first computation timing; and the third computation device 33c computes the quantity of fuel, which is injected two strokes before the predetermined stroke, at a third computation timing 120 degrees ahead of the crank angle of the timing of the computation by the second computation device. According to this procedure, the computation timings in the cylinders 11a to 11f can be brought into coincidence at each angle of 120 degrees which is the phase difference between the crank angles of the cylinders 11a to 11f. That is, the computation timings for the quantities of fuel, which are injected into the cylinders 11a to 11f, can be aligned. According to such computation timings, slight deviation occurs between the computation timing and the period of the combustion cycle, but the amount of intake air can be detected accurately, and the detection results can be reflected in the computation for fuel injection control.

The fuel injection control apparatus 30 is further equipped with a fuel quantity recording device 34 for recording the quantities of fuel computed by the computation devices 33a to 33c; and an intake air amount calculation device 35 for calculating the amounts of intake air taken in not later than the respective computation timings. The first computation device 33a computes the quantity of fuel to be injected in the predetermined stroke, from the difference between the quantity of fuel corresponding to the amount of air taken in not later than the first computation timing and the quantities of fuel computed by the second and third computation devices 33b and 33c. The second computation device 33b computes the quantity of fuel to be injected one stroke prior to the predetermined stroke, from the difference between the quantity of fuel corresponding to the amount of air taken in not later than the second computation timing and the quantity of fuel computed by the third computation device 33c not later than the second computation timing.

In other words, the computation devices 33a to 33c are adapted to compute the required fuel quantities from the intake air amounts measured before the respective strokes of the four stroke cycle, and subtract from the required fuel quantities the fuel quantities injected up to now to compute the quantity of fuel to be injected in each stroke. By so finding the fuel quantity upon subtraction of the previous value based on the intake air amount measured in real time, an error in the actual injection volume is decreased, for example, in comparison with a conventional method (the method in which the amount of change in intake air is calculated in relation to the engine rotational speed, and the amount of correction is determined based on this change amount), when the quantity of fuel is to be found.

The fuel quantity recording device 34 may be constituted integrally with or separately from the aforementioned storage unit. The intake air amount calculation device 35 is designed to calculate the intake air amount based on a signal from the intake air amount sensor 17, but the method of calculating the intake air amount is not limited to the above example. Nor is the method for calculation of the fuel quantity limited. Here, the fuel quantity is computed based on the intake air amount detected by the intake air amount calculation device 35 in consideration of the air-fuel ratio, the engine speed, etc. detected based on signals from the various sensors including the throttle position sensor 19, the air-fuel ratio sensor 21, etc. However, other parameters may be used.

In the present embodiment, the fuel injection control apparatus 30 further comprises a ratio determination device 36 for determining the ratio of the quantities of fuel to be injected from the first fuel injection valve 23 and the second fuel injection valve 27, and the third computation device 33c performs computation by multiplying the quantity of fuel corresponding to the amount of air, which has been taken in not later than the third computation timing, by the ratio determined by the ratio determination device 36. By so doing, the quantity of fuel to be injected by the second fuel injection valve 27 and the quantity of fuel to be injected by the first fuel injection valve 23 can be optimized according to the ratio determined by the ratio determination device 36, whereby the spray state can be ameliorated, and the exhaust gas can be decreased. However, the above features are not limitative. When the quantity of fuel is computed by a predetermined method, information on the drive amounts of the first fuel injection valve 23 and the second fuel injection valve 27 realizing the fuel quantity is transmitted to the injection valve drive device 32, whereupon fuel is injected.

Figure 3:
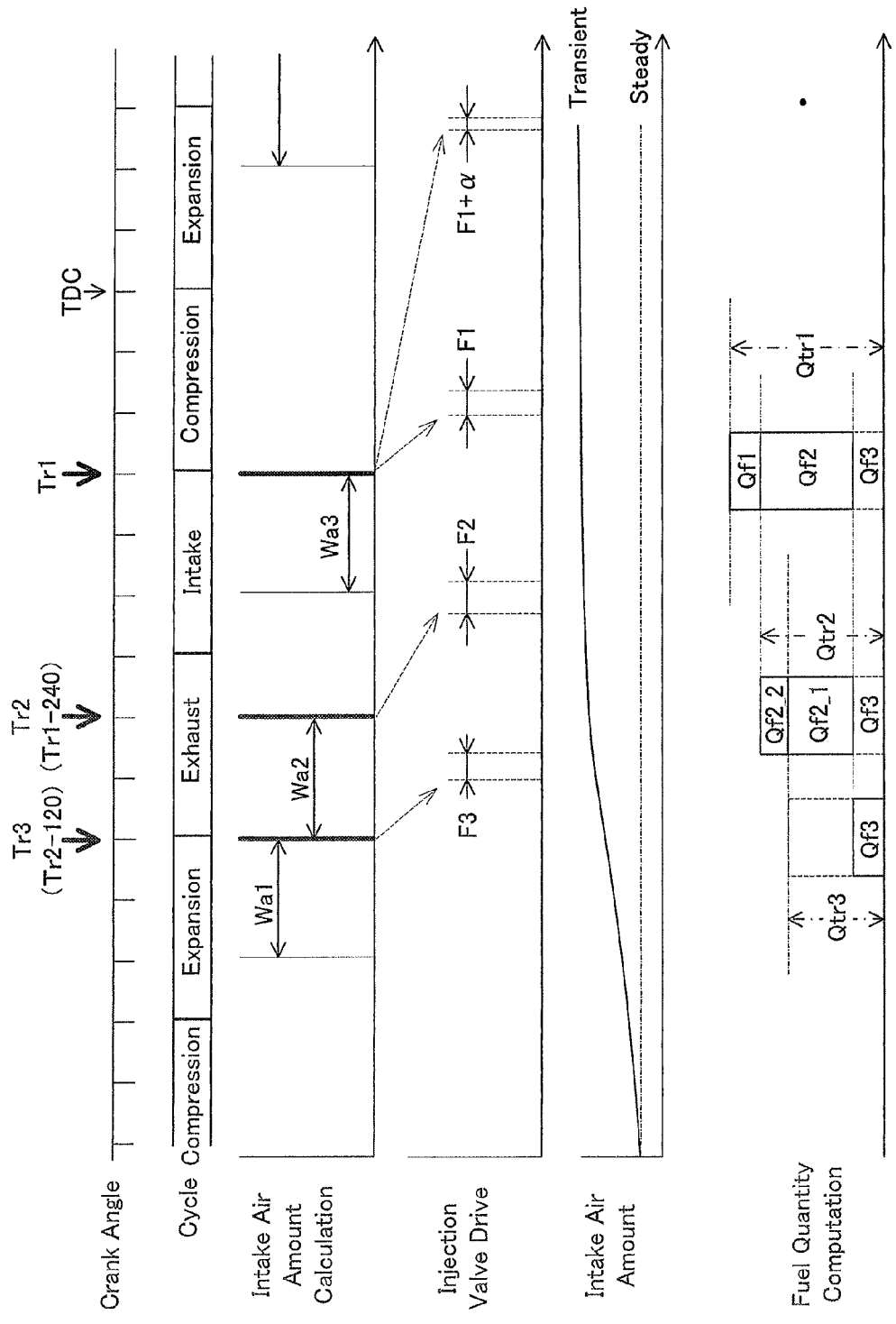
FIG. 3 is a conceptual drawing showing an example of fuel injection control according to the present embodiment.
Figure 4:
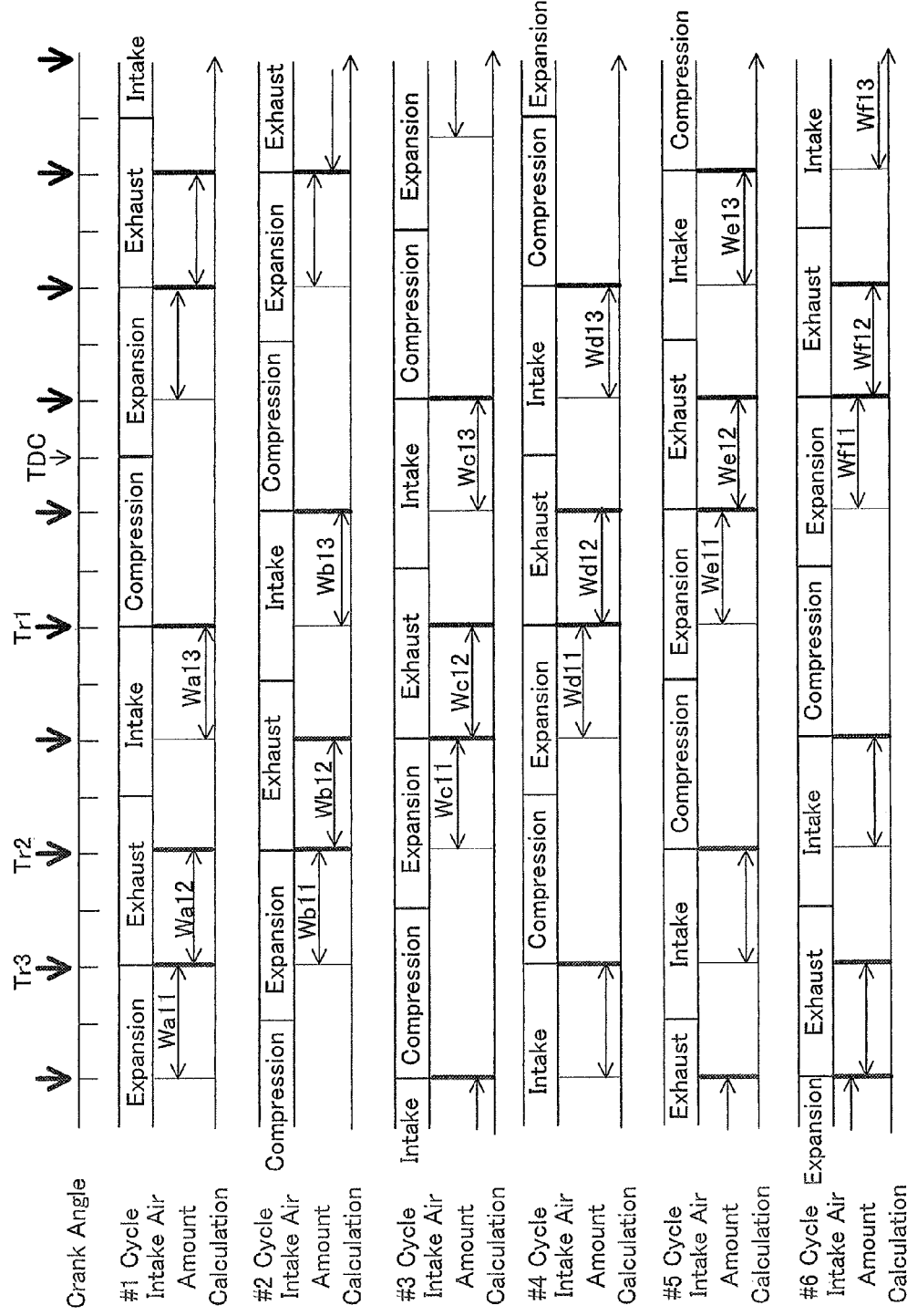
FIG. 4 is a conceptual drawing showing another example of fuel injection control according to the present embodiment.

FIGS. 3 and 4 are conceptual diagrams illustrating an example of control which is exercised by the fuel injection control apparatus 30 including the above-described computation unit 33. Of these drawings, FIG. 3 shows an example of the computation timings for fuel injection control over a predetermined cylinder (e.g., cylinder 11a), and the quantities of fuel to be injected. FIG. 4 shows an example of the computation timings for fuel injection control over all of the cylinders 11a to 11f. In the drawings, one graduation in the column "crank angle" corresponds to 60 degrees, and the computation timings for the fuel quantities are represented by arrows.

In the present embodiment, as shown in FIG. 3, the quantity of fuel in compression stroke injection F1 is computed by the first computation device 33a at the first computation timing (Tr1). The quantity of fuel in intake stroke injection F2 is computed by the second computation device 33b at the second computation timing (Tr2: TR1-240). The quantity of fuel in exhaust stroke injection (or intake stroke injection) F3 is computed by the third computation device 33c at the third computation timing (Tr3: TR2-120). Here, the quantity of fuel in expansion stroke injection F1+α, which is additionally injected in accordance with a change in the operating state or the like, is also computed by the first computation device 33a at the first computation timing (Tr1).

The contents of computations of the fuel quantities at the respective computation timings will be described in detail according to the four stroke cycle. First, based on the intake air amount Wa1 up to the third computation timing (Tr3), the required fuel quantity Qtr3 (the total of the required fuel quantities estimated at the point in time of the computation timing (Tr3)) is calculated by the third computation device 33c. The calculated value is multiplied by the injection ratio (e.g., about 3/10) determined by the above-mentioned ratio determination device 36 to calculate the fuel quantity Qf3 for the exhaust stroke injection (or intake stroke injection) F3.

Then, based on the intake air amount Wa2 during the period from the third computation timing (Tr3) to the second computation timing (Tr2), the required fuel quantity Qtr2 (the total of the required fuel quantities estimated at the point in time of the computation timing (Tr2)) is calculated by the second computation device 33b. The operating state is in transition and, as the intake air amount increases, for example, the truly necessary fuel quantity also increases in real time. Under these circumstances, the required fuel quantity Qtr2 is calculated anew at the computation timing (Tr2), and the previous required fuel quantity Qtr3 is subtracted. Upon this subtraction, the fuel quantity Qf2, the difference, comes to be obtained. That is, in addition to the essentially necessary fuel quantity Qf2_1 that has been elucidated at the computation timings so far, the fuel quantity Qf2_2 to be additionally injected is taken into consideration, whereby the fuel quantity Qf2 can be obtained.

Moreover, the intake air amount Wa3 during the period from the first computation timing (Tr1) to the point in time 120 degrees ahead of the first computation timing (Tr1) is measured by the first computation device 33a. Based on this intake amount, the required fuel quantity Qtr1 (the total of the required fuel quantities estimated at the point in time of the computation timing (Tr1)) is calculated. The period for which the intake air amount is measured includes the intake stroke and, if the required fuel quantity Qtr1 calculated based on the actual intake air amount is larger than the fuel quantity Qf3 and the fuel quantity Qf2, the fuel quantity Qf1, the difference of Qtr1 from Qf3+Qf2, is further injected. In this manner, the amount of error in the actual injection volume can be decreased further.

The example in FIG. 3 is nothing but an example. It is not absolutely necessary for actual injection to be performed in all of the strokes, like the exhaust stroke injection (or intake stroke injection) F3, the intake stroke injection F2, the compression stroke injection F1, and the expansion stroke injection F1+α. That is, the computation of the fuel quantity in the present invention includes such a computation that the fuel quantity to be injected is 0. If the results of computation indicate a fuel quantity of 0, fuel injection is not performed. Computation of the fuel quantity is performed at each computation timing as described above, but the time when to inject fuel actually for realizing the computation results is not limited unless the gist of the present invention is changed. In the present embodiment, the exhaust stroke injection (or intake stroke injection) F3 is performed by the second fuel injection valve 27, and the other stroke injections F1+α, F1, F2 are performed by the first fuel injection valve 23. However, which of the fuel injection valves 23 and 27 is used for injection is not limited unless the gist of the present invention is changed.

By adopting the above-described computation timings and calculating the fuel quantities in the above manner, the computation timings for the fuel quantities in the computation devices 33a to 33c coincide with the timings at each crank angle of 120 degrees, as shown in FIG. 4. Thus, control load on fuel injection volume computations can be reduced, and the fuel quantities to be injected in the respective strokes can be appropriately computed. In the example shown in FIG. 4, a signal from the intake air amount sensor 17 corresponding to the crank angle of 120 degrees representing the latter half of the intake stroke is used, for example, at the timing of computation of the fuel quantity for compression stroke injection in the cylinder 11a designated #1, namely, the first computation timing (Tr1) in the cylinder 11a. On the other hand, the actual intake air amount detected can be used as a reference, and the actual intake air amount in the intake stroke or the amount of intake air taken in not later than the first computation timing (Tr1) can be easily calculated. Furthermore, the intake air amount into the cylinder 11a can be accurately detected, except in a period corresponding to the crank angle of 60 degrees being the former half of the intake stroke, that is, the period during which the cylinder 11f designated #6, for example, is also in the intake stroke.

Other Embodiments

One embodiment of the present invention has been described as above, but the basic constitution of the present invention is not limited to the above embodiment. For example, this embodiment describes the aspects in which the first fuel injection valve 23 (cylinder injection valve) and the second fuel injection valve 27 (manifold injection valve) are used in combination, and the computation timing is present before each of the exhaust, intake and compression strokes. However, the present invention can be applied, of course, to an engine equipped with the first fuel injection valves (cylinder injection valves) 23 alone. In this case, there can be a computation timing before each of the intake, compression and expansion strokes.

Moreover, the actual mode of fuel injection is not limited unless the gist of the present invention is changed. For example, the present invention may be configured such that the expansion stroke injection F1+α is performed in addition to the compression stroke injection F1 as above, or the compression stroke injection F1 may be performed dividedly as former-half injection and latter-half injection. In these cases, the first computation device 33a can perform computation, at the computation timing (Tr1), for the injection divided into the compression stroke injection F1 and the expansion stroke injection F1+α, or divided into former-half injection and latter-half injection. Alternatively, it is permissible not to inject in the compression stroke injection F1, but to inject the computed fuel quantity Qf1 in the expansion stroke injection F1+α. It is also acceptable to perform no injection in the former-half injection, and to inject the computed fuel quantity Qf1 in the latter-half injection.

The injection ratio determined by the ratio determination device 36 is not limited to the aforementioned example, about 3/10, but may be a variable value, as long as this value can ameliorate the spray state and cut down emission gases. The interval between the computation timings is preferably an interval of strictly 120 degrees as the crank angle, but may be an interval of substantially 120 degrees as the crank angle, as long as it can obtain the effects of the present invention. Even if a subtle deviation in the interval between the computation timings occurs depending on the operating state or individual differences, a crank angle error of the order of plus or minus several degrees is allowed, as long as the effects of the present invention are obtained. The first computation timing (Tr) is not limited to that present in the intake stroke immediately before the compression stroke, but may be present, for example, in the compression stroke, unless the gist of the present invention is changed.

Explanations of Letters or Numerals

10 Four cycle engine (Engine) with six cylinders
11a to 11f Cylinder
12 Intake valve
13 Exhaust valve
14 Intake manifold
15 Exhaust manifold
16 Intake passage
17 Intake air amount sensor
18 Throttle valve
19 Throttle position sensor
20 Exhaust passage
21 Air-fuel ratio sensor
22 Ignition plug
23 First fuel injection valve (cylinder injection valve)
24 Crankshaft
25a to 25f Piston
26 Crank angle sensor
27 Second fuel injection valve (manifold injection valve)
30 Fuel injection control apparatus
31 Crank angle detection device
32 Injection valve drive device
33 Computation unit
33a First computation device
33b Second computation device
33c Third computation device
34 Fuel quantity recording device
35 Intake air amount calculation device
36 Ratio determination device

The invention claimed is:

1. A fuel injection control apparatus of a four cycle engine having six cylinders, comprising:
a crank angle detection device for detecting crank angles of the four cycle engine;
a first computation device for computing a quantity of fuel, which is injected when the cylinder is in a predetermined stroke of a four stroke cycle, at a first computation timing;
a second computation device for computing a quantity of fuel, which is injected one stroke before the predetermined stroke, at a second computation timing substantially 240 degrees ahead of the crank angle of the first computation timing; and
a third computation device for computing a quantity of fuel, which is injected two strokes before the predetermined stroke, at a third computation timing substantially 120 degrees ahead of the crank angle of the second computation timing.

2. The fuel injection control apparatus according to claim 1, further comprising:
a fuel quantity recording device for recording the fuel quantity computed by each of the computation devices; and
an intake air amount calculation device for calculating an amount of intake air taken in not later than each of the computation timings,
wherein the first computation device computes the quantity of fuel, which is injected in the predetermined stroke, from a difference between the quantity of fuel corresponding to the amount of air taken in not later than the first computation timing and a sum of the fuel quantities computed by the second and third computation devices.

3. The fuel injection control apparatus according to claim 2, wherein
the first computation device calculates the amount of intake air taken in not later than the first computation timing, based on the amount of intake air taken in during a period from the first computation timing to a point in time substantially 120 degrees ahead of the first computation timing.

4. The fuel injection control apparatus according to claim 2, wherein
the second computation device computes the quantity of fuel, which is injected one stroke before the predetermined stroke, from a difference between the quantity of fuel corresponding to the amount of air taken in not later than the second computation timing and the quantity of fuel computed by the third computation device not later than the second computation timing.

5. The fuel injection control apparatus according to claim 1, wherein
the predetermined stroke is a compression stroke,
the first computation device computes the quantity of fuel to be injected in the compression stroke of the four stroke cycle,
the second computation device computes the quantity of fuel to be injected in an intake stroke of the four stroke cycle, and the third computation device computes the quantity of fuel to be injected in an exhaust stroke of the four stroke cycle.

6. The fuel injection control apparatus according to claim 1, wherein the first computation timing is in an intake stroke of the four stroke cycle, the second computation timing is in an exhaust stroke of the four stroke cycle, and the third computation timing is in an expansion stroke of the four stroke cycle.

7. The fuel injection control apparatus according to claim 1, wherein the four cycle engine has a first fuel injection valve, provided in each of the six cylinders, for injecting fuel into the cylinders; and a second fuel injection valve for injecting fuel into an intake pipe of the four cycle engine, the first and second computation devices compute the fuel quantities by the first fuel injection valves, and the third computation device computes the fuel quantity by the second fuel injection valve.

8. The fuel injection control apparatus according to claim 7, further comprising a ratio determination device for determining a ratio of the quantities of fuel to be injected from the first fuel injection valve and the second fuel injection valve, wherein the third computation device performs computation by multiplying the quantity of fuel corresponding to the amount of air, which has been taken in not later than the third computation timing, by the ratio determined by the ratio determination device.

\* \* \* \* \*